United States Patent
Crombie et al.

(10) Patent No.: US 12,467,668 B2
(45) Date of Patent: *Nov. 11, 2025

(54) REFRIGERANT RECOVERY AND REPURPOSING

(71) Applicant: TRANE INTERNATIONAL INC., Davidson, NC (US)

(72) Inventors: Dermott Crombie, Kilcolgan (IE); Stephen A. Kujak, Brownsville, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,840

(22) Filed: May 7, 2024

(65) Prior Publication Data

US 2024/0288206 A1  Aug. 29, 2024

Related U.S. Application Data

(63) Continuation of application No. 17/453,128, filed on Nov. 1, 2021, now Pat. No. 11,976,858, which is a continuation of application No. 15/750,732, filed as application No. PCT/US2016/046571 on Aug. 11, 2016, now Pat. No. 11,162,720.

(60) Provisional application No. 62/203,794, filed on Aug. 11, 2015.

(51) Int. Cl.
*F25B 43/00* (2006.01)
*F25B 45/00* (2006.01)

(52) U.S. Cl.
CPC .............. *F25B 43/00* (2013.01); *F25B 45/00* (2013.01); *F25B 2345/002* (2013.01)

(58) Field of Classification Search
CPC ..... F25B 43/00; F25B 45/00; F25B 2345/002
See application file for complete search history.

(56) References Cited

U.S. PATENT DOCUMENTS

| | | |
|---|---|---|
| 5,095,713 A | 3/1992 | Laukhuf et al. |
| 5,117,641 A | 6/1992 | Keltner |
| 5,181,388 A | 1/1993 | Abraham |
| 5,226,300 A | 7/1993 | Christensen et al. |
| 5,375,426 A | 12/1994 | Burgener |

(Continued)

FOREIGN PATENT DOCUMENTS

| | | |
|---|---|---|
| CN | 101346450 A | 1/2009 |
| JP | H06-10765 U | 2/1994 |

(Continued)

OTHER PUBLICATIONS

International Search Report and Written Opinion, International Patent Application No. PCT/US2016/046571, Oct. 12, 2016 (11 pages).

(Continued)

*Primary Examiner* — Ljiljana V. Ciric
(74) *Attorney, Agent, or Firm* — HSML P.C.

(57) ABSTRACT

Methods are directed to on-site recovery and repurposing of refrigerant. The on-site recovery and/or repurposing recovers an original refrigerant and converts, in-situ, the original refrigerant into a converted refrigerant different from the original refrigerant. The converted refrigerant has a relatively lower global warming potential than the original refrigerant.

17 Claims, 1 Drawing Sheet

(56) References Cited

U.S. PATENT DOCUMENTS

| | | |
|---|---|---|
| 6,260,372 B1 | 7/2001 | Burke |
| 9,194,620 B2 | 11/2015 | McMasters et al. |
| 9,435,575 B2 | 9/2016 | Harkins |
| 9,464,833 B2 | 10/2016 | McMasters et al. |
| 9,932,507 B2 | 4/2018 | Minor |
| 10,035,940 B2 | 7/2018 | Minor et al. |
| 10,184,074 B2 | 1/2019 | Minor et al. |
| 10,330,364 B2 | 6/2019 | Harkins |
| 10,563,894 B2 | 2/2020 | Ito et al. |
| 10,571,171 B2 | 2/2020 | Gariety et al. |
| 10,571,172 B2 | 2/2020 | Low et al. |
| 10,605,507 B1 | 3/2020 | Zugibe et al. |
| 10,876,753 B2 | 12/2020 | Cruz et al. |
| 10,876,775 B2 | 12/2020 | Danielson et al. |
| 10,883,030 B2 | 1/2021 | Minor et al. |
| 10,889,427 B2 | 1/2021 | Koban et al. |
| 10,890,362 B2 | 1/2021 | Kim et al. |
| 10,895,410 B2 | 1/2021 | Hammer et al. |
| 10,907,635 B2 | 2/2021 | Oh |
| 10,907,862 B2 | 2/2021 | Petersen et al. |
| 10,907,879 B2 | 2/2021 | Lavrich |
| 10,914,266 B2 | 2/2021 | Rolandson |
| 10,921,032 B2 | 2/2021 | Goel |
| 10,921,033 B2 | 2/2021 | Ma et al. |
| 10,926,608 B2 | 2/2021 | Hosokawa et al. |
| 10,928,091 B2 | 2/2021 | Crawford et al. |
| 10,928,111 B2 | 2/2021 | Appler et al. |
| 10,948,224 B2 | 3/2021 | Novek |
| 10,955,179 B2 | 3/2021 | Kulankara |
| 11,162,720 B2 | 11/2021 | Crombie et al. |
| 11,352,534 B2 | 6/2022 | Smith |
| 11,732,170 B2 | 8/2023 | Smith |
| 11,808,499 B2 | 11/2023 | Shimozono |
| 11,840,657 B2 | 12/2023 | Minor |
| 11,976,858 B2* | 5/2024 | Crombie ............... F25B 43/00 |
| 2002/0046568 A1 | 4/2002 | Thomas et al. |
| 2003/0042463 A1 | 3/2003 | Arman et al. |
| 2004/0123622 A1 | 7/2004 | Yuzawa et al. |
| 2006/0130510 A1 | 6/2006 | Murray et al. |
| 2006/0243944 A1 | 11/2006 | Minor et al. |
| 2007/0108403 A1 | 5/2007 | Sievert et al. |
| 2008/0000240 A1 | 1/2008 | Bakker et al. |
| 2008/0099190 A1 | 5/2008 | Singh |
| 2009/0145143 A1 | 6/2009 | McMasters |
| 2009/0158771 A1 | 6/2009 | Low et al. |
| 2009/0188271 A1 | 7/2009 | Mcmasters et al. |
| 2009/0241560 A1 | 10/2009 | Murray et al. |
| 2010/0270389 A1 | 10/2010 | Feldman |
| 2010/0326094 A1 | 12/2010 | Tandou |
| 2011/0126558 A1 | 6/2011 | Thomas et al. |
| 2011/0162410 A1 | 7/2011 | Low |
| 2011/0253927 A1 | 10/2011 | Minor et al. |
| 2012/0007016 A1 | 1/2012 | Abbas |
| 2012/0145199 A1 | 6/2012 | Jernigan |
| 2013/0040349 A1 | 2/2013 | Heichberger |
| 2013/0061613 A1 | 3/2013 | Rached |
| 2013/0247597 A1 | 9/2013 | Kontomaris |
| 2013/0298578 A1 | 11/2013 | Mcmasters et al. |
| 2013/0340447 A1 | 12/2013 | Koldewey et al. |
| 2014/0216074 A1 | 8/2014 | Minor et al. |
| 2015/0197677 A1 | 7/2015 | Kontomaris |
| 2015/0377533 A1 | 12/2015 | Harkins |
| 2016/0025395 A1 | 1/2016 | Harkins |
| 2016/0102231 A1 | 4/2016 | Minor et al. |
| 2016/0200955 A1 | 7/2016 | Ueda et al. |
| 2016/0355716 A1 | 12/2016 | Fukushima et al. |
| 2016/0355717 A1 | 12/2016 | Fukushima et al. |
| 2016/0355719 A1 | 12/2016 | Fukushima et al. |
| 2016/0369146 A1 | 12/2016 | Ueno et al. |
| 2017/0058171 A1 | 3/2017 | Fukushima et al. |
| 2017/0058173 A1 | 3/2017 | Fukushima |
| 2018/0320042 A1 | 11/2018 | Tasaka et al. |
| 2018/0320043 A1 | 11/2018 | Tasaka et al. |
| 2019/0003755 A1 | 1/2019 | Crombie |
| 2019/0119542 A1 | 4/2019 | Minor et al. |
| 2019/0203992 A1 | 7/2019 | Monteith |
| 2020/0033036 A1 | 1/2020 | Yamada et al. |
| 2020/0355413 A1 | 11/2020 | Monteith |
| 2020/0408314 A1 | 12/2020 | Sugino |
| 2021/0003290 A1 | 1/2021 | Ingram |
| 2021/0003328 A1 | 1/2021 | Iovanel |
| 2021/0003329 A1 | 1/2021 | Ingram |
| 2021/0003330 A1 | 1/2021 | Makino |
| 2021/0003332 A1 | 1/2021 | Nakagawa et al. |
| 2021/0010704 A1 | 1/2021 | Kawashima et al. |
| 2021/0010728 A1 | 1/2021 | Bachellor |
| 2021/0010731 A1 | 1/2021 | Cruz |
| 2021/0018245 A1 | 1/2021 | Nishida et al. |
| 2021/0025393 A1 | 1/2021 | Hong |
| 2021/0025629 A1 | 1/2021 | Liu et al. |
| 2021/0033321 A1 | 2/2021 | Liu et al. |
| 2021/0033323 A1 | 2/2021 | Kujak |
| 2021/0040367 A1 | 2/2021 | Minor et al. |
| 2021/0041152 A1 | 2/2021 | Jones et al. |
| 2021/0055022 A1 | 2/2021 | Tanaka et al. |
| 2021/0088263 A1 | 3/2021 | Goel et al. |
| 2021/0092496 A1 | 3/2021 | Pistone et al. |
| 2021/0122962 A1 | 4/2021 | Allgood |
| 2022/0049882 A1 | 2/2022 | Crombie et al. |
| 2023/0213247 A1 | 7/2023 | Legg et al. |
| 2024/0288206 A1* | 8/2024 | Crombie ............... F25B 45/00 |

FOREIGN PATENT DOCUMENTS

| | | |
|---|---|---|
| JP | 2002-318038 A | 10/2002 |
| JP | 2012-021770 A | 2/2012 |
| JP | 2012-140629 A | 7/2012 |
| JP | 2012-526182 A | 10/2012 |

OTHER PUBLICATIONS

Extended European Search Report, European Patent Application No. 16835917.2, Mar. 22, 2019 (7 pages).

Office Action; Japanese Patent Application No. 2018-507025, Jul. 7, 2020, with English translation (14 pages).

Office Action, Chinese Patent Application No. 201680058698.X, Aug. 3, 2020, with English translation (15 pages).

Decision of Rejection, Japanese Patent Application No. 2018-507025, Dec. 8, 2020, with English translation (13 pages).

* cited by examiner

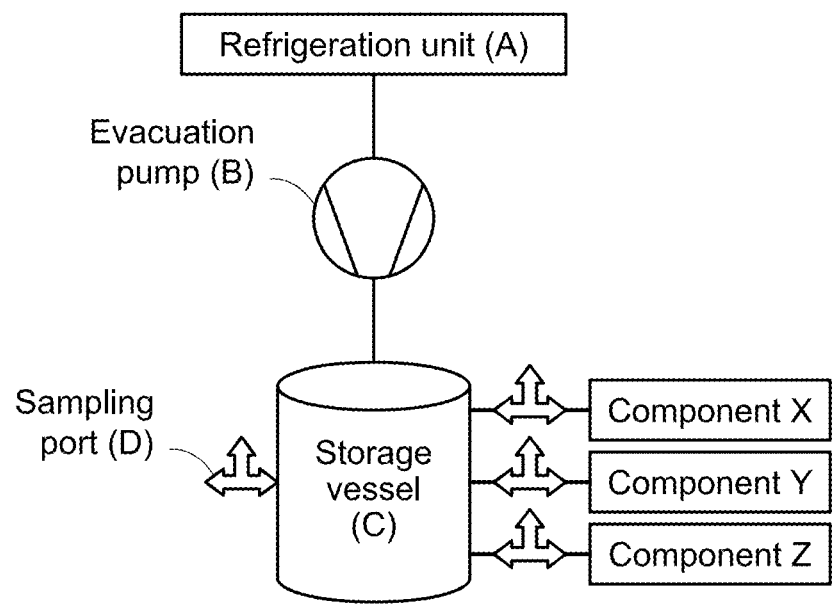

REFRIGERANT RECOVERY AND REPURPOSING

FIELD

Embodiments disclosed herein relate generally to recovery and/or repurposing of refrigerant. In particular, methods, systems and apparatuses are disclosed that are directed to on-site recovery and/or repurposing of refrigerant, where an original refrigerant is converted into a refrigerant different from the original refrigerant. The refrigerant converted from the original refrigerant can have relatively lower global warming potential (GWP) than the original refrigerant. The recovery and/or repurposing can be implemented for example in a refrigeration circuit, such as for example in general cooling and/or heating applications, which may be embodied in a heating, venting, and air conditioning (HVAC) system and/or unit, in a transport refrigeration system and/or unit, as well as in commercial, residential and/or industrial cooling and/or heating applications.

BACKGROUND

Refrigerant may be recovered, and then it is shipped to a processing site where it may be destroyed or reused.

SUMMARY

Embodiments disclosed herein relate generally to recovery and/or repurposing of refrigerant. In particular, methods, systems and apparatuses are disclosed that are directed to on-site recovery and repurposing of refrigerant, where an original refrigerant is converted into a refrigerant different from the original refrigerant.

In an embodiment, the refrigerant converted from the original refrigerant can have relatively lower global warming potential (GWP) than the original refrigerant.

In an embodiment, the refrigerant may be converted from an original refrigerant by reclamation in situ, such as for example in an operating refrigerant fluid circuit. In an embodiment, one or more refrigerant components may be added and/or removed from the original refrigerant to arrive at the converted refrigerant.

In an embodiment, the refrigerant may be converted from an original refrigerant through reclamation of the original refrigerant into a container, e.g. cylinder, where one or more refrigerant components are added and/or removed from the original refrigerant to arrive at the converted refrigerant.

In an embodiment, adding one or more refrigerant components includes charging in situ or in the container one or more refrigerants to add to the original refrigerant.

In an embodiment, the container with the converted refrigerant is repurposed to another unit.

In an embodiment, the container with the converted refrigerant is a drop in replacement for another unit. In an embodiment, the container with the converted refrigerant is compatible with other units and includes, if necessary, suitable connections, valves, and seals, e.g. gaskets, for connecting the container to another unit, such as for repurposing, and also for re-connecting the container to the original unit.

In an embodiment, the refrigerant converted from the original refrigerant has a ratio of refrigerant components different from a ratio of refrigerant components in the original refrigerant.

In an embodiment, the amount(s) and/or the type(s) of refrigerant component(s) in the refrigerant converted from the original refrigerant is different from the original refrigerant.

In an embodiment, the converted refrigerant is effectively a dilution of the GWP relative to the original refrigerant.

In an embodiment, a filter and/or dryer is employed when converting the original refrigerant to the converted refrigerant.

In an embodiment, a unit performance test is conducted to verify, confirm operation of the converted refrigeration in the same unit from which the original refrigerant was employed or in another unit into which the converted refrigerant is repurposed.

In an embodiment, the recovery of refrigerant and/or repurposing of a refrigerant converted from an original refrigerant can be implemented for example in a refrigerant fluid circuit, such as a refrigeration circuit.

In an embodiment, the refrigeration circuit can be a general cooling and/or heating applications. In an embodiment, the general cooling and/or heating application is in a heating, venting, and air conditioning (HVAC) system and/or unit.

In an embodiment, the general cooling and/or heating application is in a transport refrigeration system and/or unit.

In an embodiment, the general cooling and/or heating application is in a commercial, a residential and/or an industrial cooling and/or heating application, including systems thereof, and the like.

DRAWINGS

These and other features, aspects, and advantages of the will become better understood when the following detailed description is read with reference to the accompanying drawing, wherein:

The FIGURE is a schematic illustration of an example of refrigerant recovery and repurposing.

DETAILED DESCRIPTION

Embodiments disclosed herein relate generally to recovery and/or repurposing of refrigerant. In particular, methods, systems and apparatuses are disclosed that are directed to on-site recovery and/or repurposing of refrigerant, where an original refrigerant is converted into a refrigerant different from the original refrigerant. The refrigerant converted from the original refrigerant can have relatively lower global warming potential (GWP) than the original refrigerant. The recovery and/or repurposing can be implemented for example in a refrigeration circuit, such as for example in general cooling and/or heating applications, which may be embodied in a heating, venting, and air conditioning (HVAC) system and/or unit, in a transport refrigeration system and/or unit, as well as in commercial, residential and/or industrial cooling and/or heating applications.

In an embodiment, a refrigerant is converted from an original refrigerant, such as a previously used refrigerant from an operating or previously operating refrigerant fluid circuit. In an embodiment, the original refrigerant is tested and analyzed to determine how it may be converted into a refrigerant different from the original refrigerant. It will be appreciated that such testing and/or analysis may be done at a laboratory and/or on-site for example using known methodologies. Converting the original refrigerant can be done by adding and/or removing one or more refrigerant components into and/or from the original refrigerant. The converted refrigerant can be re-used in the same unit or used in another unit, or for a different application.

In an embodiment, the original refrigerant can be composed of one or more refrigerant components (e.g. refrigerant types) and the converted refrigerant resulting from conversion of the original refrigerant can be composed of one or more refrigerant components.

In an embodiment, the refrigerant may be converted from an original refrigerant in situ, such as for example in an operating refrigerant fluid circuit. In an embodiment, one or more refrigerant component s may be added and/or removed from the original refrigerant to arrive at the converted refrigerant. In an embodiment, in situ means on-site, whereas "on-site" means for example the location where the refrigerant is being used, such as the location of a machine for example a refrigeration unit, e.g. cooling and/or heating system, whether it is in operation or not.

As one example, the original refrigerant to converted refrigerant can be reclamation by in situ conversion of R134a refrigerant in a chiller and/or bus to R513A. The result of R513A can be achieved through mixing within the unit.

In an embodiment, the refrigerant may be converted from an original refrigerant through reclamation of the original refrigerant into a container, e.g. cylinder, where one or more refrigerant components are added and/or removed from the original refrigerant to arrive at the converted refrigerant.

As one example, the original refrigerant to converted refrigerant can be the reclamation of all or a portion of the R134a from an existing unit into a container, e.g. cylinder, which contains or would have added to it an amount of R1234yf to make up the resulting R513A.

In an embodiment, the container or unit may be recharged with the correct amount of refrigerant (e.g. R1234yf), leaving out excess R134a, if any, to arrive at the targeted or desired converted refrigerant, which in some cases is a blend.

In an embodiment, the GWP of R134a is about or over 1400, whereas the GWP of R513A is about 630, which is significantly less than the GWP of R134a, and in some instances less than half.

The FIGURE shows an embodiment of refrigerant reclamation into a container, e.g. cylinder, using a reclamation system.

As shown in the FIGURE, refrigerant is recovered from refrigeration unit (A), for example in one embodiment by utilizing an evacuation pump (B). In an embodiment, the refrigerant is stored in a container, such as storage vessel (C).

In an embodiment, the refrigerant is sampled via port (D). Analysis of the recovered (e.g. original) refrigerant allows addition of other refrigerant components to be determined.

In an embodiment, the addition of other refrigerant components may come from a container, X, Y, and/or Z.

In an embodiment, to create a new blend, for example to meet a certain R400 or R500 series of refrigerant, one or more refrigerant components from the container(s) X, Y, and/or Z is added to the container (C).

It will be appreciated that suitable connections, valves, and seals, e.g. gaskets, for connecting the container (C) to the pump (B), the refrigeration unit (A), the containers including components (X), (Y), and/or (Z) are provided in the system shown in the FIGURE. The arrows shown in the FIGURE indicate potential fluid flow directions depending on the application desired.

It will be appreciated that the container (C) includes one or more openings suitable to feed one or more refrigerant components from the container (X), (Y), and/or (Z). It will be appreciated that port (D) may be used as such an opening.

The converted refrigerant can be reused either in the source refrigeration unit, or in another unit or application. For example, R134a can be re-purposed as R513A through the reclamation system.

In an embodiment, any R452 blend can be repurposed into any other system using R452 blend. In an embodiment, an original refrigerant, e.g. R410A, may be converted to an R452 blend.

The charts below are examples of converted refrigerants from original refrigerants in refrigeration systems types, including chillers, bus, and stationary.

Product in situ R134a conversion to R513A in a chiller. e.g. in a water cooled screw chiller: Conversion Chart I.

| Rated Capacity (tons) | Original R134a Refrigerant Charge (lbs) | Reclamation of R134a (lbs) from Unit | Addition of R1234yf (lbs) to Unit |
|---|---|---|---|
| 100 | 200 | 112.00 | 112.00 |
| 125 | 250 | 140.00 | 140.00 |
| 150 | 300 | 168.00 | 168.00 |
| 200 | 400 | 224.00 | 224.00 |
| 250 | 500 | 280.00 | 280.00 |
| 300 | 600 | 336.00 | 336.00 |
| 350 | 700 | 392.00 | 392.00 |
| 400 | 800 | 448.00 | 448.00 |

Product in situ R134a conversion to R513A in a chiller. e.g. in a water cooled screw chiller: Conversion Chart II.

| Rated Capacity (tons) | Original R134a Refrigerant Charge (lbs) | Reclamation of 100% R134a (lbs) from Unit into an evacuated Refrigerant Recovery Cylinder | Addition of R1234yf (lbs) to R134a Refrigerant Recovery Cylinder to make R513A | R513A Recharge Amount (lbs) | Excess R513A (lbs) |
|---|---|---|---|---|---|
| 100 | 200 | 200.00 | 254.55 | 200.00 | 54.55 |
| 125 | 250 | 250.00 | 318.18 | 250.00 | 68.18 |
| 150 | 300 | 300.00 | 381.82 | 300.00 | 81.82 |
| 200 | 400 | 400.00 | 509.09 | 400.00 | 109.09 |
| 250 | 500 | 500.00 | 636.36 | 500.00 | 136.36 |
| 300 | 600 | 600.00 | 763.64 | 600.00 | 163.64 |
| 350 | 700 | 700.00 | 890.91 | 700.00 | 190.91 |
| 400 | 800 | 800.00 | 1018.18 | 800.00 | 218.18 |

Product in situ R134a conversion to R513A in a bus, e.g. bus air conditioner: Conversion Chart III.

| Original R134a Refrigerant Charge (lbs) | Reclamation of R134a (lbs) from Unit | Addition of R1234yf (lbs) to Unit |
|---|---|---|
| 11.03 | 6.17 | 6.17 |
| 14.33 | 8.03 | 8.03 |
| 17.86 | 10.00 | 10.00 |
| 17.86 | 10.00 | 10.00 |
| 17.86 | 10.00 | 10.00 |
| 17.86 | 10.00 | 10.00 |
| 6.17 | 3.46 | 3.46 |
| 8.16 | 4.57 | 4.57 |
| 8.16 | 4.57 | 4.57 |
| 8.16 | 4.57 | 4.57 |
| 8.38 | 4.69 | 4.69 |

-continued

| Original R134a Refrigerant Charge (lbs) | Reclamation of R134a (lbs) from Unit | Addition of R1234yf (lbs) to Unit |
|---|---|---|
| 4.85 | 2.72 | 2.72 |

Reclamation (container) Method for R134a to R513A in a bus. e.g. bus air conditioner: Conversion Chart IV.

| Original R134a Refrigerant Charge (lbs) | Reclamation of 100% R134a (lbs) from Unit into an evacuated Refrigerant Recovery Cylinder | Addition of R1234yf (lbs) to R134a Refrigerant Recovery Cylinder to make R513A | R513A Recharge Amount (lbs) | Excess R513A (lbs) |
|---|---|---|---|---|
| 11.03 | 11.03 | 14.03 | 11.03 | 3.01 |
| 14.33 | 14.33 | 18.24 | 14.33 | 3.91 |
| 17.86 | 17.86 | 22.74 | 17.86 | 4.87 |
| 17.86 | 17.86 | 22.74 | 17.86 | 4.87 |
| 17.86 | 17.86 | 22.73 | 17.86 | 4.87 |
| 17.86 | 17.86 | 22.73 | 17.86 | 4.87 |
| 6.17 | 6.17 | 7.86 | 6.17 | 1.68 |
| 8.16 | 8.16 | 10.39 | 8.16 | 2.23 |
| 8.16 | 8.16 | 10.39 | 8.16 | 2.23 |
| 8.16 | 8.16 | 10.39 | 8.16 | 2.23 |
| 8.38 | 8.38 | 10.67 | 8.38 | 2.29 |
| 4.85 | 4.85 | 6.17 | 4.85 | 1.32 |

The FIGURE may be used to achieve the different converted blends shown in any of the Charts I, II, III, and IV.

Reclamation (container) of R410A conversion to R452B in a stationary air conditioner: Conversion Chart V.

| Rated Capacity | Original R410A Refrigerant Charge (lbs) | Reclamation of 100% R410A (lbs) from Unit into an evacuated Refrigerant Recovery Cylinder | R452B Formulation Mixture Cylinder (lbs of refrigerant) | R32 (lbs) in Formulation Cylinder | R1234yf (lbs) in Formulation Cylinder | Total R452B Amount (lbs) | Recharge of Unit with R452B (lbs) | Excess R452B (lbs) |
|---|---|---|---|---|---|---|---|---|
| 15 | 7.55 | 7.55 | 46.22 | 32.22 | 14.00 | 53.77 | 6.80 | 46.98 |
| 15 | 7.55 | 7.55 | 46.22 | 32.22 | 14.00 | 53.77 | 6.80 | 46.98 |
| 15 | 7.55 | 7.55 | 46.22 | 32.22 | 14.00 | 53.77 | 6.80 | 46.98 |
| 17.5 | 8.35 | 8.35 | 51.12 | 35.64 | 15.48 | 59.47 | 7.52 | 51.96 |
| 17.5 | 8.35 | 8.35 | 51.12 | 35.64 | 15.48 | 59.47 | 7.52 | 51.96 |
| 20 | 10.15 | 10.15 | 62.14 | 43.32 | 18.82 | 72.29 | 9.14 | 63.16 |
| 20 | 10.15 | 10.15 | 62.14 | 43.32 | 18.82 | 72.29 | 9.14 | 63.16 |
| 25 | 10.2 | 10.2 | 62.45 | 43.54 | 18.91 | 72.65 | 9.18 | 63.47 |
| 25 | 10.2 | 10.2 | 62.45 | 43.54 | 18.91 | 72.65 | 9.18 | 63.47 |

The FIGURE may be used to achieve the different converted blends in shown in Chart V.

It will be appreciated that the above original refrigerants and converted refrigerants are exemplary refrigerants (e.g. blends) only. Other original or recovered refrigerants may be converted, e.g. other types of R400 series and R500 blends, into suitable converted refrigerants based on certain desired or suitable blends, targeted or necessary blends, depending on the application. In an embodiment, the application can be for example to lower overall GWP and/or to achieve a different property for the resulting converted refrigerant. It will be appreciated that R400 and R500 series refrigerant blends, for example, are composed of two or more refrigerant components. In some cases, a converted, e.g. "next-generation", refrigerant is a blend of a previous generation, plus one or more new refrigerant components. By recovering the original (e.g. previous) refrigerant, and by adding the new appropriate refrigerant component(s) in the correct ratios, a converted blend can be produced.

As above, examples of this include: R134a (GWP about 1410) which has a GWP that is more than two times R513A (GWP=631). R513A can be obtained by the addition of R1234yf to the reclaimed R134a.

Advantages of repurposing refrigerant in accordance with the concepts described herein include: re-use (e.g. recycling) of an existing refrigerant; avoiding returning old refrigerant to a central recycling plant, with associated shipping and time costs; encouraging responsible re-use of refrigerant when possible; and allowing for meeting low-GWP regulations in a quick and simple manner.

Furthermore, repurposing refrigerant in accordance with the concepts described herein include potentially saving time, reducing refrigerant handling, reducing cost, and reducing the potential for greenhouse gas (GHG) emissions to the atmosphere.

By repurposing a relatively high GWP at the use location, the cost and complexity of returning the high GWP refrigerant to a central location is avoided. Additionally, the relatively high GWP refrigerant may be used as a component of a next generation lower GWP refrigerant, which can save cost and reduce potential future greenhouse gas (GHG) emissions.

Generally, the methods, systems, and apparatuses herein are able to produce a converted, lower GWP refrigerant, for re-use, re-purposing, and the like.

Aspects-Any one or more of aspects 1 to 9 may be combined with any one or more of aspects 10 to 13.

1. A method of converting a refrigerant, comprising:
   recovering a refrigerant from a refrigeration unit using an evacuation pump;
   containing the recovered refrigerant in a container;
   sampling from the container the recovered refrigerant;
   testing the recovered refrigerant; and
   converting the recovered refrigerant into a converted refrigerant that is different from recovered refrigerant.

2. The method of aspect 1, further comprising one or more of using the converted refrigerant in the refrigeration unit, using the converted refrigerant in another refrigeration unit, and storing the converted refrigerant.

3. The method of aspect 1 or 2, wherein the converting comprises diluting of the recovered refrigerant to obtain the converted refrigerant, where the converted refrigerant has a lower global warming potential (GWP) than the recovered refrigerant.
4. The method of any one or more of aspects 1 to 3, wherein the converting comprises using one or more of a filter and dryer.
5. The method of any one or more of aspects 1 to 4, wherein the converting comprises adding into the container with the recovered refrigerant, one or more other refrigerant components, and/or removing one or more refrigerants from the recovered refrigerant to obtain the converted refrigerant.
6. The method of any one or more of aspects 1 to 4, wherein the converted refrigerant is a refrigerant blend, the converting comprises adding into the container with the recovered refrigerant, one or more other refrigerant components to obtain the converted refrigerant.
7. The method of any one or more of aspects 1 to 6, wherein the converted refrigerant has a relatively lower global warming potential (GWP) than the recovered refrigerant.
8. The method of any one or more of aspects 1 to 7, wherein the converted refrigerant is a blend of refrigerant components and the recovered refrigerant is a blend of refrigerant components, where the converted refrigerant having a ratio of refrigerant components that is different from a ratio of refrigerant components present in the recovered refrigerant.
9. The method of any one or more of aspects 1 to 8, wherein the refrigeration unit is a refrigeration circuit selected from a residential heating, ventilation, air conditioning (HVAC) system, commercial heating, ventilation, air conditioning (HVAC) system, industrial cooling and/or heating system, or transport refrigeration system.
10. A system for converting a refrigerant, comprising:
an evacuation pump;
a container fluidly connected to the evacuation pump, the evacuation pump and the container configured to recover a refrigerant from a refrigeration unit, the container including a sampling port; and
one or more refrigerant containers,
the one or more refrigerant containers including one or more refrigerant components,
wherein the one or more containers being in fluid communication with the container to deliver the one or more refrigerant components into the container in an amount to convert a refrigerant recovered by the evacuation pump and the container into a converted refrigerant.
11. The system of aspect 10, wherein the one or more refrigerant components is effective to lower a global warming potential (GWP) of the refrigerant recovered by the evacuation pump and the container.
12. The system of aspect 10 or 11, wherein the one or more refrigerant containers includes an amount of the one or more refrigerants that is effective to obtain a desired property of the converted refrigerant.
13. The system of aspect 12, wherein the desired property is reduced global warming potential (GWP) relative to the refrigerant recovered by the evacuation pump and the container.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A method of converting in situ a refrigerant into a refrigerant blend with a lower global warming potential, the method comprising:
recovering a refrigerant from a refrigeration unit using an evacuation pump, the recovered refrigerant including one or more refrigerants;
converting in situ, in a container, the recovered refrigerant into a converted refrigerant, the converting resulting in the converted refrigerant having a global warming potential that is lower than the global warming potential of the recovered refrigerant, wherein the converting comprises adding, to the container, the recovered refrigerant and one or more additional refrigerants different from any one of the one or more refrigerants in the recovered refrigerant, the one or more additional refrigerants having a lower GWP than the recovered refrigerant.

2. The method of claim 1, wherein the adding, to the container, the recovered refrigerant and the one or more additional refrigerants comprises:
adding the recovered refrigerant to the container, and
adding into the container with the recovered refrigerant, the one or more additional refrigerants.

3. The method of claim 2, wherein the adding of the recovered refrigerant to the container is by reclamation of the recovered refrigerant into the container.

4. The method of claim 1, wherein the adding, to the container, the recovered refrigerant and the one or more additional refrigerants comprises:
adding the one or more additional refrigerants into the container, and
adding into the container with the one or more additional refrigerants, the recovered refrigerant.

5. The method of claim 1, further comprising using the converted refrigerant in the refrigeration unit.

6. The method of claim 1, wherein the converting comprises diluting of the recovered refrigerant to obtain the converted refrigerant.

7. The method of claim 1, wherein the converting comprises using one or more of a filter and dryer.

8. The method of claim 1, wherein the converting comprises removing one or more refrigerants from the recovered refrigerant to obtain the converted refrigerant.

9. The method of claim 1, further comprising:
sampling the refrigerant from the container; and
testing the sampled refrigerant.

10. The method of claim 1, wherein the converted refrigerant is one of a R400 series refrigerant blend and an R500 series refrigerant blend.

11. The method of claim 10, wherein the one or more additional refrigerants include R1234yf.

12. The method of claim 10, wherein the one or more refrigerants of the recovered refrigerant include R134a.

13. The method of claim 1, further comprising storing the converted refrigerant.

14. The method of claim 1, wherein the refrigeration unit is a refrigeration circuit in a residential heating, ventilation, air conditioning system.

15. The method of claim 1, wherein the refrigeration unit is a refrigeration circuit in a commercial heating, ventilation, air conditioning system.

16. The method of claim 1, wherein the refrigeration unit is a refrigeration circuit in an industrial cooling and/or heating system.

17. The method of claim 1, wherein the refrigeration unit is a refrigeration circuit in a transport refrigeration system.

* * * * *